Jan. 26, 1943.  E. F. HERZOG  2,309,455
VARIABLE CAPACITOR
Filed June 21, 1940
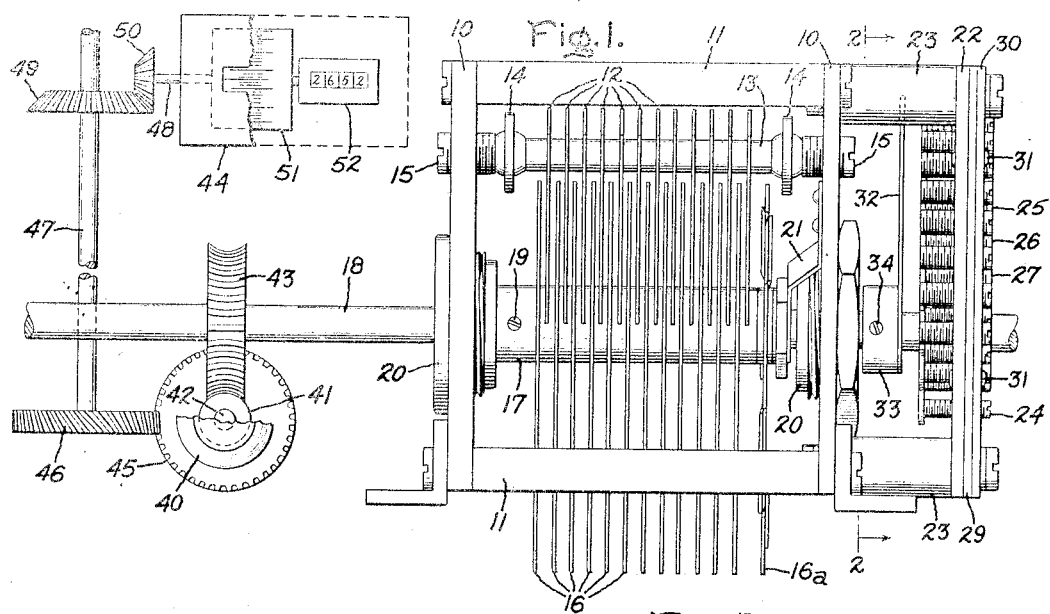
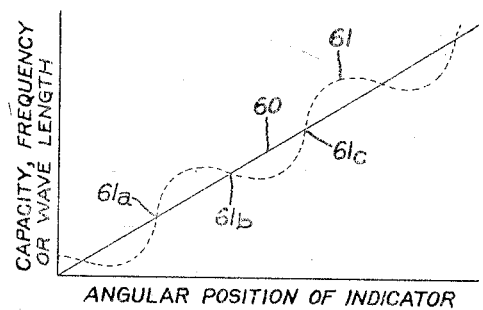
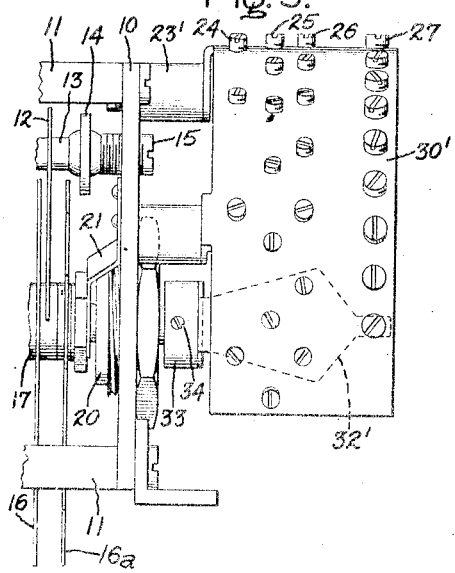
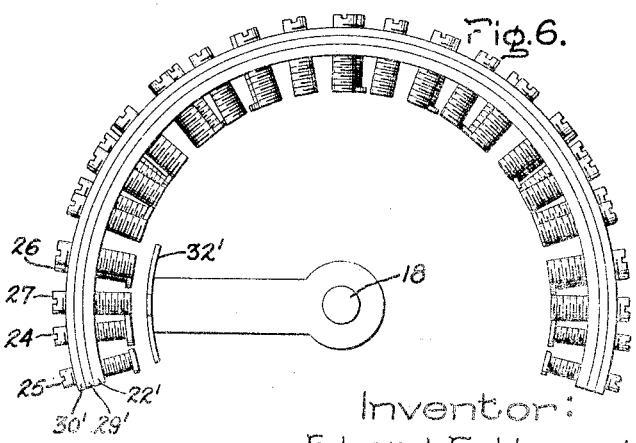
Inventor:
Edward F. Herzog,
by Harry E. Dunham
His Attorney.

Patented Jan. 26, 1943

2,309,455

UNITED STATES PATENT OFFICE 2,309,455

VARIABLE CAPACITOR

Edward F. Herzog, Schenectady, N. Y., assignor to General Electric Company, a corporation of New York Application June 21, 1940, Serial No. 341,694

12 Claims. (Cl. 175—41.5)

My invention relates to variable capacitors such for example as those employed in oscillation circuits. My invention finds particular utility in high frequency amplifier or oscillator circuits wherein extremely precise tuning adjustments are required.

In electrical apparatus employing oscillation circuits, such as radio transmitters and receivers, variable capacitors are commonly employed as frequency determining elements. These should be designed to follow accurately a predetermined law of capacity variation with tuning adjustment. This is particularly true where capacitors in a plurality of high frequency circuits are mechanically interconnected for simultaneous adjustment through unicontrol means, for example, in the high frequency amplifier and oscillator circuits of superheterodyne radio receivers.

By properly shaping the rotor and stator plates of the variable capacitor, the capacity variation may be made to approximate a desired capacity curve as is well known to those skilled in the art. It is often convenient to produce the so-called "straight-line-capacity curve" with angular rotor movement; or, where the capacitor is associated with a particular oscillation circuit, a "straight-line-frequency" or "straight-line-wave-length" law of variation may be desired. Due to manufacturing tolerances and unavoidable inaccuracies, the capacity curve is rarely of the exact shape desired. Therefore, compensating means is usually provided for making final adjustments. A common expedient is to provide one or more of the rotor or stator plates with slotted portions which may be deformed or bent locally to reduce capacity errors. Such means are satisfactory in many cases, but where extreme precision is required a more accurate compensating means is highly desirable. For example, in a particular precision capacitor which was required to track a straight-line frequency curve within plus or minus one-hundredth of one per cent frequency error, even the most careful construction and adjustment of the plates was found insufficient to meet such extremely close tolerances.

One of the objects of my invention is therefore to provide an improved variable capacitor having relatively movable elements so constructed and arranged that they may be adjusted readily and accurately in order to cause the capacity to vary, with a high degree of precision, in a predetermined manner. While my capacitor may of course be employed independently as an electrical circuit element, it finds its greatest utility as a compensating or trimmer capacitor, either as an integral part of a larger capacitor or in conjunction therewith.

It has further been observed that where a precision variable capacitor is geared to a device for visual'y indicating the capacitor setting, there may be a small cyclic or recurrent error in correspondence between the actual capacitor setting and the indicator reading. This is apparently due to unavoidable errors in cutting or aligning the various gear teeth. My invention, therefore, also provides improved means whereby errors arising from such causes may be substantially eliminated.

More specifically, in accordance with my invention one of the plates of my improved capacitor comprises a plurality of elemental plates which may be adjusted individually to compensate for any capacity errors in the capacitor or due to associated apparatus whether these errors are regular or irregular, recurrent or non-recurrent.

The features of my invention which I believe to be novel are set forth with particularity in the appended claims. My invention itself, however, together with further objects and advantages thereof, may best be understood by reference to the following description taken in connection with the accompanying drawing, in which Fig. 1 is a front elevation, partly schematic, of a variable capacitor structure embodying my invention; Fig. 2 is a sectional view along the line 2—2 of Fig. 1; Figs. 3 and 4 are detail sectional views along the lines 3—3 and 4—4 of Fig. 2; Figs. 5 and 6 are fragmentary front and end elevations of a modified form of my invention; and Fig. 7 is a graphic representation of certain characteristics of my invention.

Corresponding parts in the various views and in the accompanying specification have been designated by corresponding reference numerals.

Referring now to Fig. 1, a variable air capacitor is illustrated comprising a suitable supporting frame having end plates 10 spaced apart by members 11. Supported in any suitable manner between the end plates 10 is a stator structure comprising a plurality of spaced metal plates 12. As illustrated, these are supported on a rod or rods 13. The stator is positioned in and electrically isolated from the supporting frame by means of insulators 14 interposed between the ends of rod 13 and set screws 15 threaded into the plates 10.

As illustrated, the rotor element comprises a plurality of similarly spaced plates 16 secured to a sleeve 17. The sleeve 17 is secured to the rotor shaft 18 by means of a set screw 19. The shaft 18 is journaled in suitable bearings 20 mounted in the end plates 10. Any suitable means may be provided for preventing axial play of the rotor plates with respect to the stator plates, such as the spring biasing member 21.

The rotor and stator plates 12 and 16 may of course be of any suitable shape to produce the desired capacity curve. In order to provide coarse adjustments for compensating manufacturing inaccuracies, one of the plates may be deformable, in accordance with known practice. For example, as illustrated, one of the rotor plates 16a is slotted so that individual portions thereof may be bent toward or away from the adjacent stator plate.

Thus far the capacitor construction described is conventional. In order to provide precise adjustment in accordance with my invention an additional pair of rotor and stator elements is provided. While it will be understood that these elements may form an integral part of the structure just described, it may be preferable to construct them as elements of a compensating or trimmer capacitor demountably secured to the main capacitor structure.

In the structure illustrated in Fig. 1, an additional end plate 22 is supported by the end plate 10 of the main capacitor frame and is spaced therefrom by means of insulating supporting posts 23. Supported by the plate 22 and extending transversely thereof are a plurality of adjustable metal studs 24—27. As is better shown in Figs. 2, 3 and 4, these studs, in the illustrated embodiment, are in the form of screws or stud bolts 24—27 threaded into the plate 22. While they may be rods or pins slidably supported in plate 22, they are preferably of the form shown in order to permit easy and accurate adjustment transversely of the plate 22. The outer ends of the studs are slotted to receive an adjusting tool, such as a screw driver. The inner ends may be of any desired size and shape depending upon how it is desired to have the capacity vary as the studs are adjusted. In the illustrated embodiment the studs 27 are of uniform cross-section as shown in Fig. 3, while the studs 24, 25 and 26 have enlarged flattened heads as indicated at 28 in Fig. 4.

The plate 22 is preferably of metal, so as to connect all of the studs 24—27 together electrically to form a unitary stator element in which the studs 24—27 are elemental capacity determining plates. The plate 22 may be electrically connected to the stator plates 12 by any suitable connector, not shown.

In order to hold the studs 24—27 in adjusted position a sheet of friction material 29 is provided. This may be of rubber, felt, fiber, or other suitable material. This sheet is clamped between the face of the plate 22 and a clamping plate 30 by means of rivets 31. The clamping plate 30 has holes drilled therethrough registering with the threaded holes in plate 22 and large enough to clear the studs, as shown. Of course, lock nuts and lock washers or other suitable means might optionally be employed for holding the studs 24—27 in adjusted position, though the construction illustrated is simple and permits close spacing of the studs.

The arrangement of the studs may also vary widely depending upon the compensating action desired. In the illustrated embodiment, as shown in Fig. 2, the studs are arranged on arcs of concentric circles about the axis of the shaft 18. The various rows of studs are preferably angularly staggered in a radial direction to avoid abrupt capacity variations.

The rotor 32 of the precision compensating capacitor structure may also be of any desired shape, depending upon the correction curve desired. As illustrated in Fig. 2, it is relatively narrow, roughly approximating a circular sector in shape and is of substantially greater area than any one of the studs. It will also be observed that the effective capacity surface area provided by the rotor 32 is substantially less than the total effective capacity surface area provided by the studs 24, 25, and 26. Therefore the rotor 32 is in active capacity-determining relationship with a fraction only of the total number of studs in any angular position of the rotor. For reasons that will be explained later, the rotor 32 is shown as being provided with a reduced end portion 32a which cooperates with the outer row of studs 27. The rotor 32 is mounted on a collar 33 which is secured to the shaft 18 by the set screw 34. Thus, the rotor 32 is electrically and mechanically interconnected with the rotor plates 16 of the main capacitor and is simultaneously rotatable therewith.

As shown in Fig. 1, the rotor shaft 18 is driven from a control knob 40 through the reduction worm gear comprising a worm 41 mounted on the same shaft 42 as the control knob 40 and engaging a worm wheel 43 secured to the shaft 18. An indicator 44 is also illustrated for indicating the capacitor setting at any particular angular position of the rotor shaft 18. As shown, a screw gear 45, which is also secured to the shaft 42, engages a similar screw gear 46 on the vertical shaft 47. This latter shaft drives the horizontal indicator shaft 48 through the bevel gears 49 and 50. Since the shaft 48 makes a plurality of revolutions for one revolution of shaft 18, the indicator 44 is provided with a drum 51 for indicating fractions of a revolution of the shaft 48 and a revolution counter or register 52 for indicating the number of complete revolutions made by the shaft 48. The drum 51 and revolution counter 52 are preferably calibrated directly in terms of capacity, frequency or wave length. The indicator 44 might be mounted directly on the control knob shaft 42 or on the rotor shaft 18 but the particular arrangement shown is advantageous when the capacitor is arranged to be switched into any one of a number of different oscillation circuits, each associated with a different wave band. In such case, other indicators similar to 44 may be driven from shaft 47, each being suitably calibrated for a particular wave band. It will of course be understood that more than one capacitor may be operated simultaneously from the shaft 18.

Figs. 5 and 6 illustrate a modified form of the precision compensating capacitor structure. The same reference numerals have been applied to identical parts and similar numerals with a prime affixed to similar parts. It will be evident that the rotor 32' and the plate 22' supporting the studs 24—27 have been formed in the shapes of portions of concentric cylindrical surfaces having axes coincident with the axis of the shaft 18. The details of the structure and method of operation are substantially the same as in the embodiment of Figs. 1–4. A detailed description of this modification is therefore thought unnecessary. The peripheral arrangement of the studs 24—27, which extend radially through the cylindrical supporting structure, may make it easier in certain cases to adjust the studs than where the studs are arranged as in Figs. 1-4.

As stated earlier, the stator plates 12 and rotor plates 16 may be given any desired shape to approximate a predetermined capacity curve. Approximate correction may then be obtained by bending portions of the slotted rotor plate 16a. The final precision adjustment may then be made by adjusting the studs 24—26. As these studs move toward or away from the rotor 32, the dimensions of the dielectric interposed therebetween (air in this case) are correspondingly varied, with resultant change in the capacity therebetween.

It will also be apparent from the drawing that, since the rotor plate 32 has a smaller effective area than the total area of the studs, adjustment of any stud effects changes in the capacity curve only within that fractional range of rotor movement wherein the rotor is in capacitive relationship with that particular stud. This is of decided advantage, since it permits the shape of one portion of the curve to be adjusted without thereby affecting the shape of other portions. The rotor may be made as narrow as desired to localize the capacity-varying effect of each stud to any desired extent. Thus, as shown in the drawing the rotor portion 32a is approximately of the same effective area as each stud 27. Therefore, adjustment of each of these studs effects capacity variations only within a few degrees of rotor movement, for reasons now to be explained in detail.

As previously mentioned, it has been found that certain cyclic or recurrent errors of small magnitude may exist between the reading of the indicator 44 and the actual capacity setting. It has been determined that these are due to irregularities in the gears of the gear train driving the indicator shaft 48 from the rotor shaft 18. Apparently one source of error in a particular structure, having a gear reduction ratio of one to thirty-six in the worm gear, was in the worm gear 42—43, since a recurring error was noted which repeated itself for every ten degrees rotation of the shaft 18. Some of this error may also have been contributed by inaccuracies in gears 45 and 46, which had a one to one ratio. Fig. 7 illustrates this error graphically. The abscissae correspond to angular positions of the indicator 44, i. e., the reading of the drum 51 and revolution counter 52, while the ordinates may correspond to capacity, frequency or wave length. In one capacitor actually constructed, which was designed to have a straight-line-frequency variation, as indicated by the curve 60, the cyclic error caused by the gears caused the indicator reading to depart from this curve somewhat as indicated by the dotted curve 61. It will be observed that in the interval between the points 61a and 61b the frequency was higher than it should have been while in the interval between 61b and 61c it was lower. This recurrent error went through a complete cycle, as between 61a and 61c, for every complete revolution of the shaft 42 and for every ten degrees of revolution of the shaft 18. Of course, the shape of this dotted curve in a particular case may or may not be as indicated, and it is greatly exaggerated in Fig. 7 for purposes of illustration, since the actual maximum observed error in this particular capacitor due to these causes was only of the order of plus or minus five-thousandths of one per cent of the assigned frequency.

The recurrent error in calibration due to inaccuracies in the gear drive may be substantially eliminated by properly spacing and adjusting the outer row of studs 27 which cooperate with the narrow tongue 32a on the rotor 32. In the particular capacitor discussed in the preceding paragraph, the studs 27 were angularly spaced ten degrees apart and adjusted toward or away from the narrow tongue 32a, as necessary. This spacing permitted compensation for errors on one side of the straight line curve 60, reducing the maximum frequency deviations due to inaccuracies in the gear train by substantially fifty per cent. This brought the error within the tolerances permitted in this particular case. Of course, substantially complete compensation could have been secured by spacing the studs five degrees apart and adjusting to compensate for deviations on both sides of curve 60. In other cases it may be necessary to space these studs angularly about the rotor shaft 18 according to a different law, depending upon the manner in which the error between the indicator reading and capacity setting varies as a function of the gear irregularities. This is easily determined in any particular case by plotting an empirical curve of actual capacity setting against indicator reading. The studs may then be placed at the angular rotor positions at which maximum departures occur and individually adjusted to make the capacity correspond to the indicator reading. Thus, the capacitor can be made to follow the desired capacity curve with great precision.

Although the adjustable studs, in the illustrated embodiments of my invention, have been shown mounted on the stationary element, of course they may be mounted on the movable element. However, for ease and precision of adjustment the arrangement shown is generally to be preferred.

While I have shown particular embodiments of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. A variable capacitor comprising relatively movable elements cooperatively arranged to produce a predetermined capacity curve, a first one of said elements comprising one conductive plate of said capacitor, a second one of said elements comprising a supporting structure and a plurality of individual conductive studs supported by said structure and extending into capacitive relation with said first element, said studs being electrically interconnected to form an opposing plate of said capacitor, said first element providing an effective capacity surface area substantially less than the total effective capacity surface area provided by said studs and cooperating with a fraction only of the total number of said studs in any capacity-determining position of said elements, said studs being individually adjustable relative to said structure toward and away from said first element, whereby said capacity curve may be adjusted with precision to a predetermined shape.

2. A variable capacitor comprising adjacent fixed and movable elements arranged to produce a predetermined capacity curve, said movable element comprising one conductive plate of said capacitor, said fixed element comprising a supporting structure and a plurality of individual conductive studs supported by said structure and projecting into capacitive spaced relation with respect to said movable element, said studs being electrically interconnected to form an opposing plate of said capacitor, said movable element providing an effective capacity surface area substantially less than the total effective capacity surface area provided by said studs and cooperating with a fraction only of the total number of said studs in any capacity-determining position of said elements, said studs being individually adjustable relative to said structure toward and away from the path of movement of said movable element, whereby said capacity curve may be adjusted with precision to a predetermined shape.

3. A variable capacitor comprising relatively movable spaced rotor and stator elements adapted to produce a predetermined capacity curve, said stator element comprising a conductive plate and a plurality of closely spaced, individual conductive studs each supported by said plate and projecting into capacitive relation to said rotor element in certain angular positions thereof, said rotor element providing an effective capacity surface area substantially less than the total effective capacity surface area provided by said studs and cooperating capacitively with a fraction only of the total number of said studs in any angular position thereof, said studs being arranged in angularly overlapping relationship with respect to the path of movement of said rotor element and being individually adjustable relative to said plate substantially transversely of the path of movement of said rotor, whereby the shape of said capacity curve may be predetermined with precision.

4. A variable capacitor structure comprising a stationary element and a cooperating rotatable element adapted to produce a predetermined capacity variation therebetween with angular variation in the position of said rotatable element, said stationary element comprising a supporting metal plate and a plurality of individual metal screws each threaded into the surface of said plate and projecting into capacitive spaced relationship with said rotatable element in certain angular positions thereof, said rotatable element providing an effective capacity surface area substantially less than the total effective capacity surface area provided by the projecting ends of said screws and cooperating capacitively with a fraction only of the total number of said screws in any angular position thereof, said screws being individually adjustable relative to said rotatable element substantially transversely of the path of movement thereof, whereby said capacity variation may be predetermined with precision by adjusting said screws.

5. In a variable capacitor adapted to follow precisely a predetermined law of capacity variation, the combination of a pair of relatively movable, spaced capacity determining elements, a first one of said elements comprising one electrically conducting plate of said capacitor, the other of said elements comprising a conductive supporting plate and a plurality of closely spaced stud bolts threaded into said plate and extending from the surface thereof toward said first element, said first element providing an effective capacity surface area substantially less than the total effective capacity surface area provided by said bolts and cooperating with a fraction only of the total number of said bolts in any capacity-determining position of said elements, said bolts being arranged in overlapping relationship with respect to the path of movement of said first element and being individually adjustable for effecting stable capacity adjustments of said capacitor.

6. In a precision variable air capacitor, the combination comprising a pair of spaced capacity determining elements relatively movable with respect to each other in a predetermined path, a first one of said elements comprising one electrically conducting plate of said capacitor, and the other of said elements comprising a conductive supporting plate and a plurality of closely spaced stud bolts threaded into said plate and extending from the surface thereof toward said first element, the head of each bolt being of small area as compared to the area of said first element and the total capacity plate area provided by the heads of said bolts being substantially greater than the area of said first element, said bolts being individually adjustable, whereby stable capacity adjustments may be made in small increments, through individual adjustments of said bolts, in order to make said capacitor follow a predetermined law of capacity variation with precision.

7. A compensating air capacitor for producing capacity variations following a predetermined capacity curve comprising, in combination, a compensating rotor plate positioned adjacent a compensating stator element, said stator element comprising a supporting structure and a plurality of individually adjustable studs supported by said structure and having their heads adjacent the path of movement of said compensating rotor plate, said studs being electically interconnected to form a compensating stator plate, said rotor plate being relatively narrow and cooperating with a fraction only of the total number of said studs in any angular position thereof, whereby said capacity variations may be adjusted in small increments, by individual adjustments of said studs, so as to follow said curve with precision.

8. A compensating air capacitor for producing capacity variations following a predetermined capacity curve comprising, in combination, a compensating rotor plate positioned adjacent a compensating stator element, said stator element comprising a plurality of closely spaced, individually adjustable screws threaded into a common metal plate and having their heads adjacent the path of movement of said compensating rotor plate, said screws being arranged in angularly overlapping relationship with respect to said path of movement, the head of each screw being of small area as compared to the area of said rotor plate and the total capacity plate area provided by the heads of said screws being substantially greater than the area of said rotor plate, whereby said capacity variations may be adjusted in small increments, by individual adjustments of said screws, so as to follow said curve with precision.

9. In combination, a variable air capacitor having a rotor and a stator cooperatively arranged to produce capacity variations following a predetermined capacity curve, means for producing an indication of said variations, means comprising a train of gears mechanically interconnecting said indicating means and said capacitor, whereby irregularities in said train of gears cause recurrent errors in correspondence between said capacitor and said means, and correction means for bringing the capacity of said capacitor into precise correspondence with the indication of said means, said correction means comprising a compensating rotor plate movable with said rotor and a compensating stator element, said stator element comprising a plurality of stud bolts threaded into a conductive supporting plate and extending from the surface thereof toward the path of movement of said rotor plate, the shape of said rotor plate and the angular spacing of said studs about the axis of said rotor being functions of said gear irregularities.

10. In combination, a variable air capacitor having a rotor and a stator cooperatively arranged to produce a range of capacity variations following a predetermined capacity curve, on indicating device calibrated in terms of said variations and having an actuating shaft which must be rotated through a plurality of revolutions to produce indications covering said range, a train of gears mechanically interconnecting said actuating shaft and said rotor, whereby irregularities in said train of gears cause recurrent errors in correspondence between said capacitor and device which have a periodicity related to the gear ratio, and capacity varying means comprising a rotor plate rotatable with said rotor and a stator element, said stator element comprising a plurality of metal screws threaded into a metal plate and having their heads extending toward the path of movement of said rotor plate, said screws being located about the axis of rotation of said rotor plate at different angular positions related to said gear ratio and being individually adjustable to correct said errors in correspondence.

11. In combination, a variable capacitor comprising a rotor and a stator adapted to produce capacity variations following a predetermined capacity curve, an indicating device adapted to produce a continuous indication of said variations, means including a train of gears mechanically interconnecting said indicating device and said rotor, whereby irregularities in said train of gears cause periodic errors in correspondence between the capacity of said capacitor and the indication of said device, and correction means for producing a periodic variation in the capacity of said capacitor in a sense to reduce said errors in correspondece.

12. In combination, a variable capacitor comprising a rotor and a stator adapted to produce capacity variations following a predetermined capacity curve, an indicating device adapted to produce a continuous visible indication of said variations, means including a train of gears mechanically interconnecting said indicating device and said rotor, whereby irregularities in said train of gears cause recurrent errors in correspondence between the capacity of said capacitor and the indication of said device, and correction means for bringing the capacity of said capacitor into substantially exact correspondence with the indication of said device, said correction means comprising a compensating rotor plate movable with said rotor and a compensating stator element, said stator element comprising a plurality of individually adjustable studs supported by a metal plate and projecting into capacitive relation to said rotor plate in certain positions thereof, and said studs being angularly positioned about the axis of said rotor in accordance with a function of said gear irregularities.

EDWARD F. HERZOG.